United States Patent
Hung

(10) Patent No.: US 8,070,232 B2
(45) Date of Patent: Dec. 6, 2011

(54) SCOOTER WITH DUAL CHAIR BACKS

(75) Inventor: Cheng-Hung Hung, Taichung (TW)

(73) Assignees: Moventon Corporation, Taichung (TW); Cheng-Hung Hung, Taichung (TW)

( * ) Notice: Subject to any disclaimer, the term of this patent is extended or adjusted under 35 U.S.C. 154(b) by 179 days.

(21) Appl. No.: 12/421,835

(22) Filed: Apr. 10, 2009

(65) Prior Publication Data

US 2010/0052400 A1 Mar. 4, 2010

(30) Foreign Application Priority Data

Aug. 27, 2008 (TW) ................................ 97215369 U

(51) Int. Cl.
*B60N 2/02* (2006.01)
(52) U.S. Cl. ................ 297/383; 297/301.1; 297/353; 297/450.1; 297/452.4; 297/DIG. 4; 280/304.1
(58) Field of Classification Search ............... 280/304.1; 297/285, 301.1, 353, 383, 440.2, 450.1, 452.4, 297/DIG. 4
See application file for complete search history.

(56) References Cited

U.S. PATENT DOCUMENTS

| | | | | |
|---|---|---|---|---|
| 538,407 | A * | 4/1895 | Browne | 297/325 |
| 1,011,026 | A * | 12/1911 | Carpenter | 297/452.29 |
| 2,858,876 | A * | 11/1958 | Woodson, Jr. | 297/353 |
| 2,991,124 | A * | 7/1961 | Schwarz | 297/284.4 |
| 4,073,537 | A * | 2/1978 | Hammersburg | 297/464 |
| 4,161,337 | A * | 7/1979 | Ross et al. | 297/230.12 |
| 4,375,295 | A * | 3/1983 | Volin | 280/304.1 |
| 4,639,042 | A * | 1/1987 | Lange | 297/440.2 |
| 4,813,693 | A * | 3/1989 | Lockard et al. | 280/42 |
| 4,911,502 | A * | 3/1990 | Gorman | 297/452.34 |
| 5,195,804 | A * | 3/1993 | Stolle et al. | 297/452.33 |
| 5,228,747 | A * | 7/1993 | Greene | 297/284.3 |
| 5,447,356 | A * | 9/1995 | Snijders | 297/284.3 |
| 5,524,969 | A * | 6/1996 | Harrison et al. | 297/354.12 |
| 5,556,168 | A * | 9/1996 | Dinsmoor et al. | 297/440.2 |
| 5,586,808 | A * | 12/1996 | Oelke | 297/287 |
| D413,085 | S * | 8/1999 | Bar et al. | D12/133 |
| 5,944,385 | A * | 8/1999 | Pearce | 297/354.12 |
| 6,257,664 | B1 * | 7/2001 | Chew et al. | 297/284.9 |
| 6,352,307 | B1 * | 3/2002 | Engman | 297/284.11 |
| 6,460,933 | B1 * | 10/2002 | Bors et al. | 297/440.2 |
| 6,520,578 | B1 * | 2/2003 | Jospa et al. | 297/217.1 |
| 6,659,563 | B2 * | 12/2003 | Float et al. | 297/440.2 |
| 6,688,693 | B2 * | 2/2004 | Griffiths et al. | 297/354.12 |
| 6,840,577 | B2 * | 1/2005 | Watkins | 297/284.9 |
| D517,456 | S * | 3/2006 | Wu et al. | D12/131 |
| 7,090,303 | B2 * | 8/2006 | Kropa | 297/466 |
| 7,104,610 | B2 * | 9/2006 | Cramer | 297/440.2 |
| 7,210,705 | B2 * | 5/2007 | Chen et al | 280/775 |
| 7,278,688 | B1 * | 10/2007 | Hung | 297/354.11 |

* cited by examiner

*Primary Examiner* — Laurie Cranmer
(74) *Attorney, Agent, or Firm* — Egbert Law Offices PLLC

(57) ABSTRACT

The present invention provides a scooter with two chair backs. The scooter includes a main body containing a wheel seat, a pedal and front/rear wheel set; two chair back supports, assembled separately onto both sides on the back of wheel seat of the main body; and two chair backs, incorporated onto at least one chair back support via the connecting frame and transversely arranged at interval. The scooter of the present invention substantially improves the structural functionality and comfort of the chair back of the scooter, and also meets the diversified customer requirements with improved applicability.

4 Claims, 6 Drawing Sheets

SCOOTER WITH DUAL CHAIR BACKS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a scooter, and more particularly to an innovative scooter with dual supports and dual chair backs.

2. Description of Related Art Including Information Disclosed Under 37 CFR 1.97 and 37 CFR 1.98

The scooter in the present invention refers to a powered/powerless wheelchair or scooter. With recent product innovation and market development, scooters are now commonly used by customers. To meet the diversified customer requirements in a competitive market, scooters need to be structurally modified to improve performance and quality in tune with the growing development trend.

Because customers may lean on the chair back for a long time, the structure of the chair back is decisive with regard to comfort while riding. So, the chair back becomes a key factor in deciding to purchase scooter by a customer. However, the chair back of the typical scooter does not satisfy customer demands since the prior art chair back does not improve functionality or comfort.

Thus, to overcome the aforementioned problems of the prior art, it would be an advancement in the art to provide an improved structure that can significantly improve efficacy.

Therefore, the inventor has provided the present invention of practicability after deliberate design and evaluation based on years of experience in the production, development and design of related products.

BRIEF SUMMARY OF THE INVENTION

Based on the unique structure of the present invention, a scooter is structurally fitted with two chair back supports along with two chair backs. These two chair backs are adapted to the back shape; moreover, given the clearance between two chair backs, the leaning width of the chairs can be regulated through the regulating member, making it possible to improve substantially the structural functionality and comfort of the chair back of the scooter. The diversified customer requirements are met with improved applicability.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
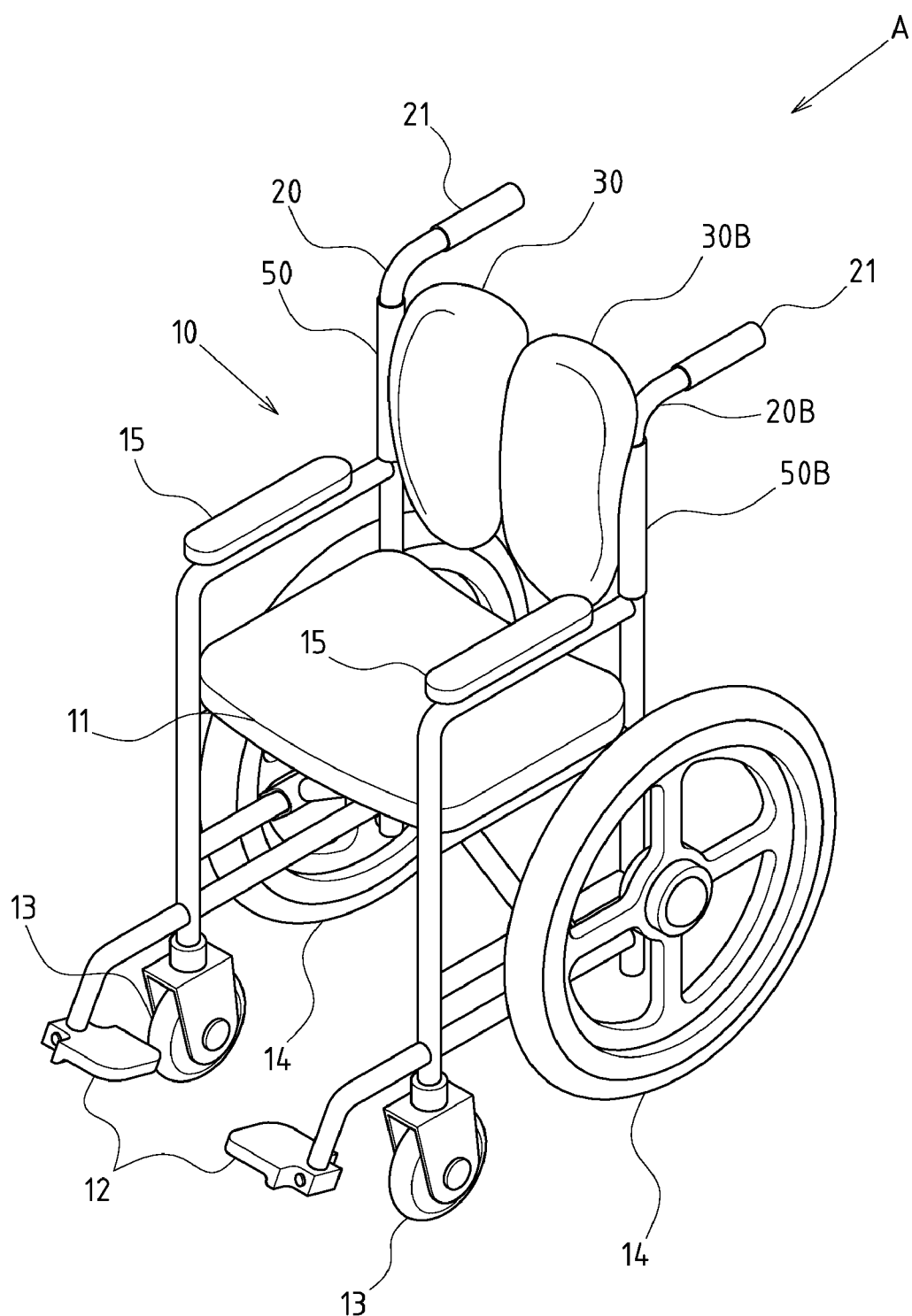
FIG. 1 shows an assembled perspective view of the preferred embodiment of the present invention.

The features and the advantages of the present invention will be more readily understood upon a thoughtful deliberation of the following detailed description of a preferred embodiment of the present invention with reference to the accompanying drawings.

FIGS. 1-5 depict preferred embodiments of a scooter of the present invention with dual chair backs. The embodiments are provided for only explanatory purposes with respect to the patent claims.

The scooter A of the present invention refers to a wheelchair or electric wheelchair. The scooter A includes a main body 10, containing a wheel seat 11, a pedal 12, a front wheel set 13 and a rear wheel set 14. Two armrests 15 are arranged onto both sides of the wheel seat 11.

Two chair back supports 20, 20B are assembled at intervals onto both sides on the back of wheel seat 11 of the main body 10. Two handles 21 are bent and formed on the top of two chair back supports 20, 20B.

Two chair backs 30, 30B are incorporated onto at least one chair back support 20, 20B via the connecting frame 40, 40B. These two chair backs 30, 30B are transversely arranged at intervals.

Connecting frames 40, 40B are separately assembled onto the back surface of these two chair backs 30, 30B, and then incorporated individually onto two chair back supports 20, 20B. Moreover, the connecting frames 40, 40B assembled onto the chair back support 20, 20B may be adapted with the chair back supports 20, 20B via a pivotal member 50, 50B, so that the connecting frames 40, 40B along with the chair backs 30, 30B can rotate around the pivotal members 50, 50B. Furthermore, the pivotal members 50, 50B can be securely mated with the chair back supports 20, 20B through a locating member 60 (e.g. a bolt). With this structure, when the collapsible wheelchair (i.e. scooter A) is retracted, two chair back supports 20, 20B can be put closer together. In such a case, the revolving connecting frames 40, 40B and chair backs 30, 30B achieve smooth retraction of the wheelchair.

Figure 3:
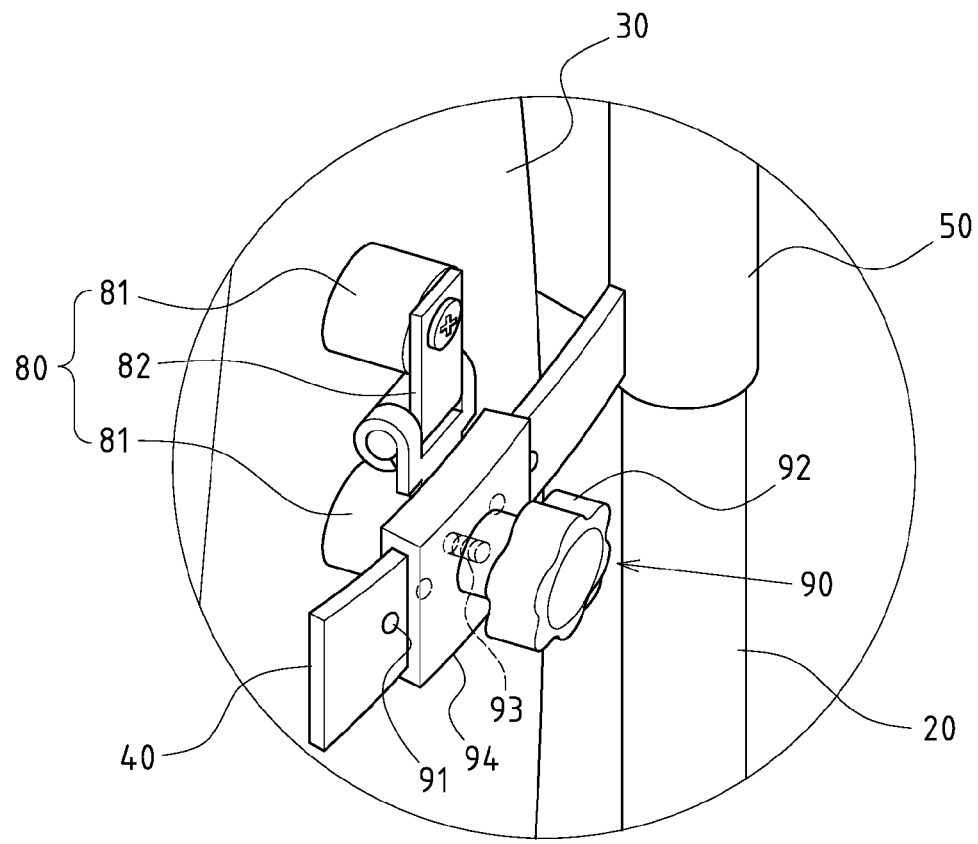
FIG. 3 shows a partially enlarged perspective view of FIG. 2.
Figure 4:
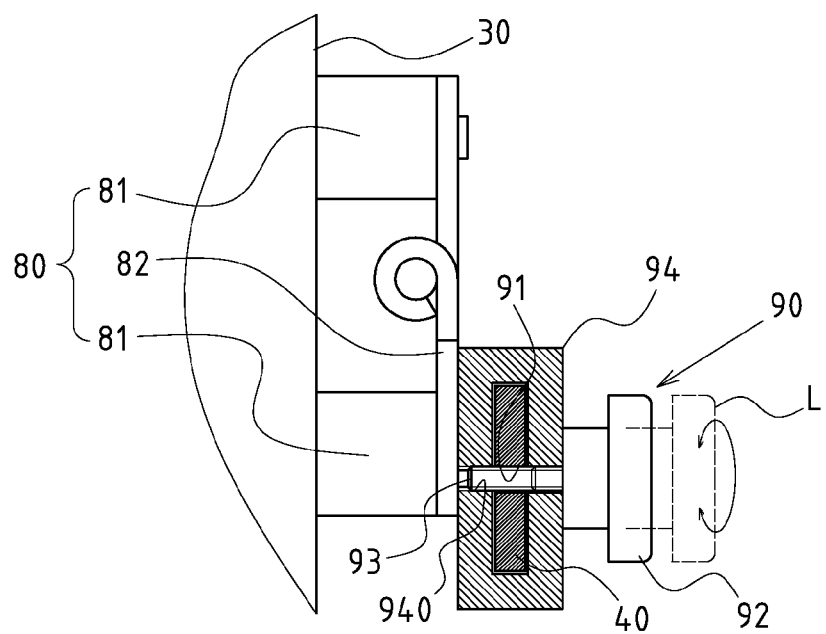
FIG. 4 shows a partially sectional view FIG. 3.
Figure 5:
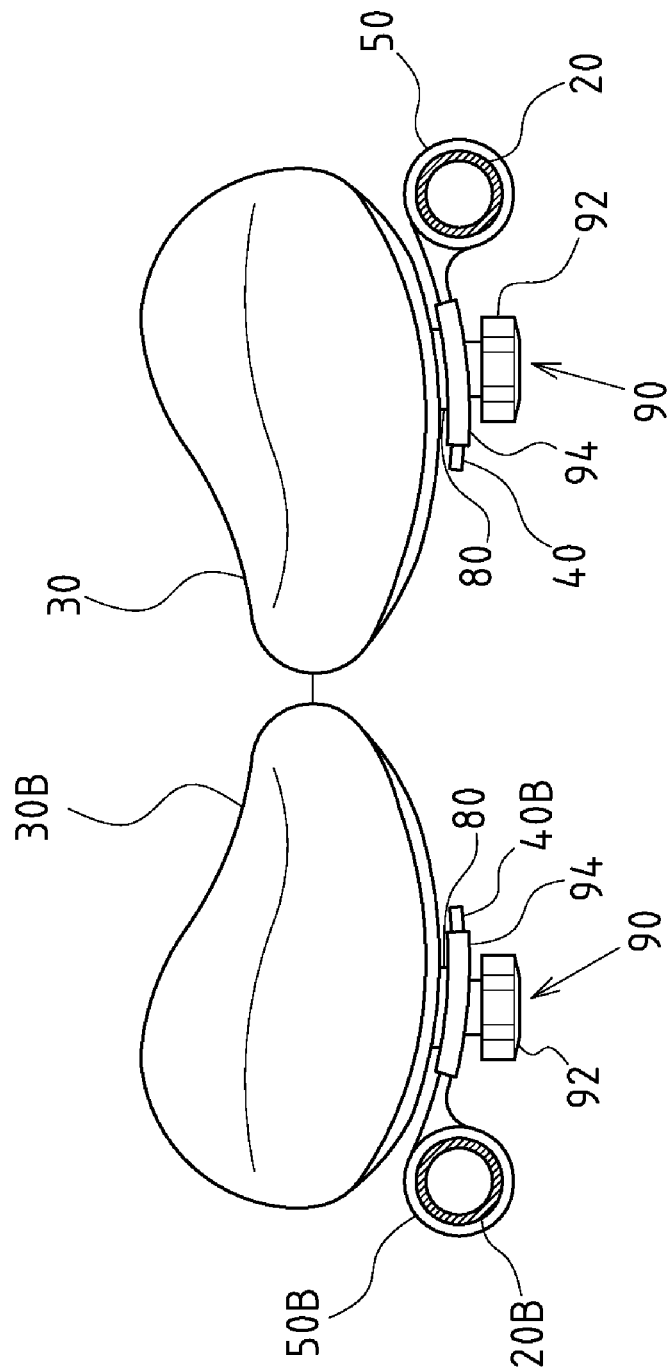
FIG. 5 shows a top plan view of the preferred embodiment of the present invention, showing a profile of the chair back support.

Referring to FIGS. 3 and 4, an elastic support 80 is arranged between the connecting frame 40 (40B) and chair back 30 (30B). The elastic support 80 contains a plurality of elastic gaskets 81 at intervals and a set of mounting ledge 82. One end of the elastic gaskets 81 is positioned securely onto the back surface of the chair back 30 (30B), and the other end is positioned securely onto the mounting ledge 82. The mounting ledge 82 is then assembled corresponding to the connecting frame 40 (40B), so that the chair back 30 (30B) presents flexibility and a buffering effect.

Figure 2:
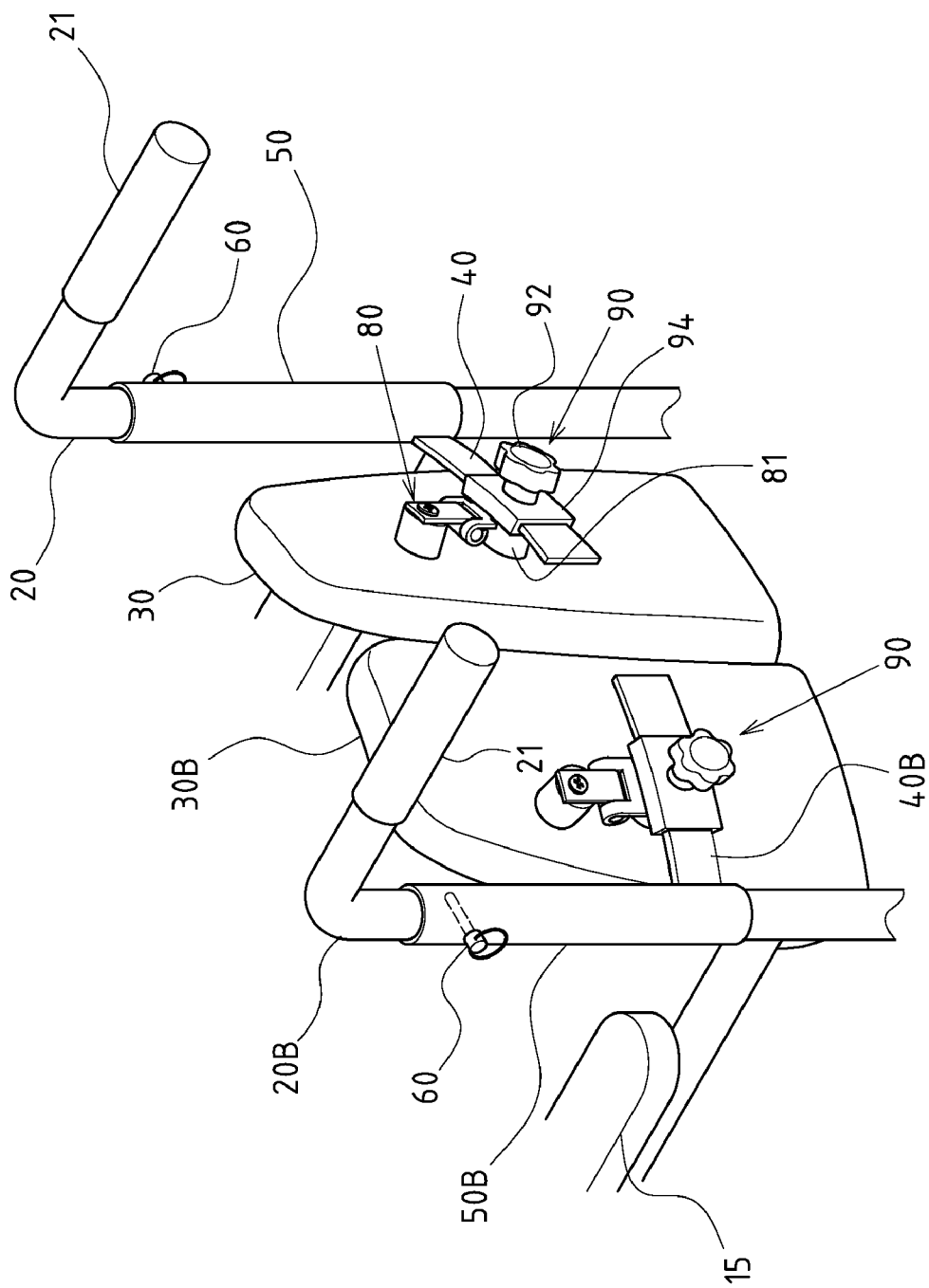
FIG. 2 shows a perspective view of the chair back of the present invention viewed from back angle.

Referring to FIGS. 2, 3, and 4, a regulating member 90 is assembled between the connecting frames 40, 40B and chair backs 30, 30B, thereby adjusting the position of the chair backs 30, 30B. The regulating member 90 may comprise a plurality of alternated locating holes 91 and a locking button 92 on the connecting frame 40, 40B. The locking button 92 is provided with a stud 93 that penetrates the locating hole 91, and then is screwed into the tapped hole 940 of a guide frame 94 on the back surface of the chair back 30, 30B (shown in FIG. 4). When the locking button 92 is loosened (indicated by arrow L in FIG. 4), the chair back 30, 30B will move transversely along the guide frame 94, and the chair backs 30, 30B can be positioned when the locking button 92 is screwed to penetrate the corresponding locating hole 91.

Figure 6:
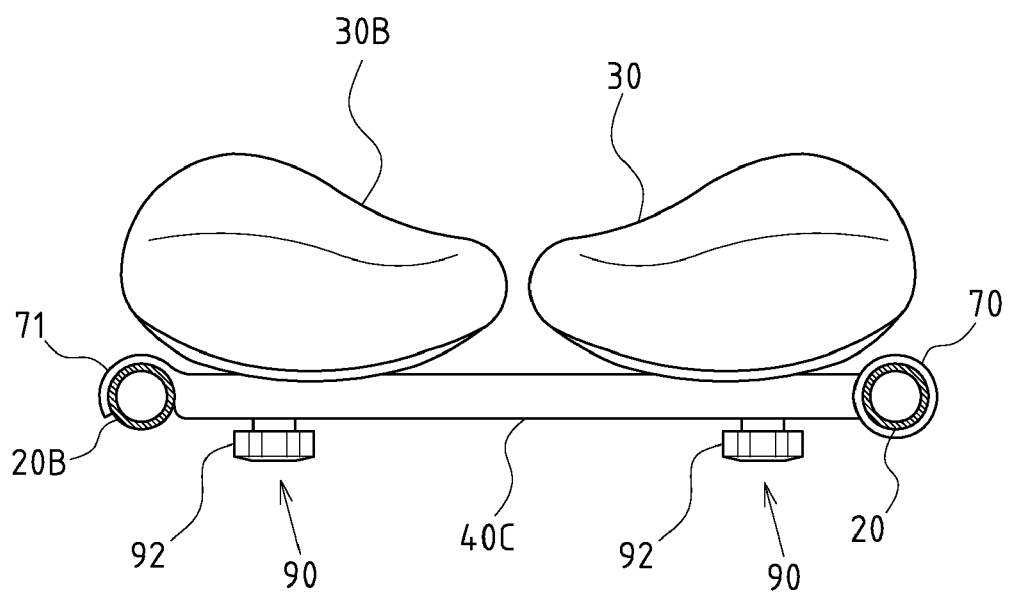
FIG. 6 shows a top plan view of another preferred embodiment of the present invention, showing the chair back assembled with the chair back support.
Figure 7:
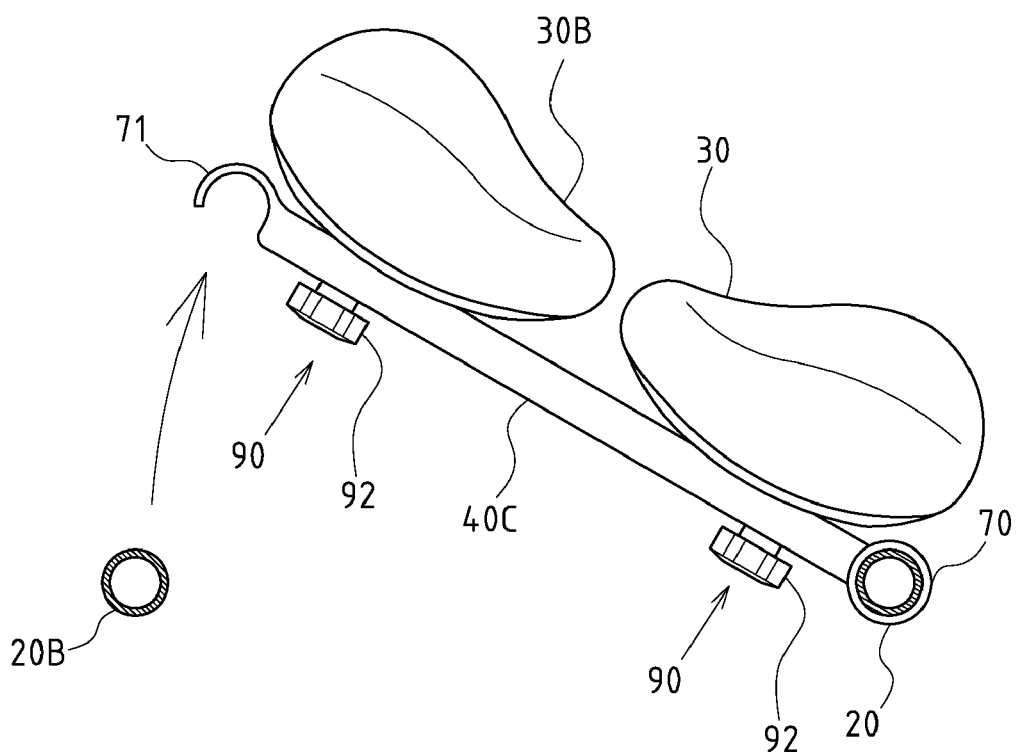
FIG. 7 shows a top plan view of the swinging of chair back support in FIG. 6.

Referring also to FIG. 6, the back surface of both chair backs 30, 30B can be assembled onto a single connecting frame 40C, where both ends of the connecting frame 40C are separately assembled onto two chair back supports 20, 20B. In this preferred embodiment, one end of the connecting frame 40C is assembled onto the chair back support 20 via a pivotal portion 70, and the other end is provided with a removable mating portion 71. The removable mating portion 71 can be mated with or separated from the corresponding chair back support 20B. Referring to FIG. 7, the removable mating portion 71 is separated from the corresponding chair back support 20B.

Figure 8:
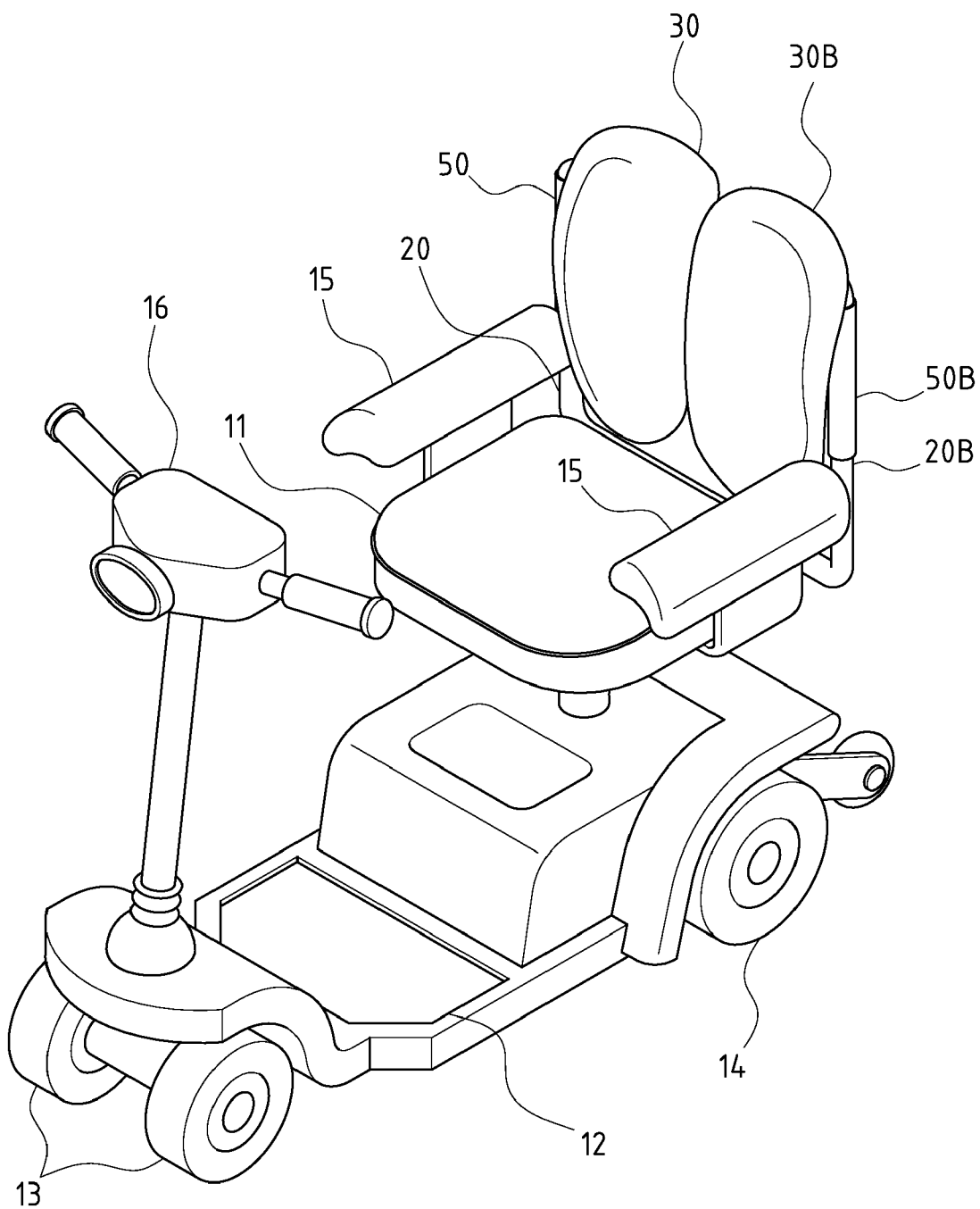
FIG. 8 shows a perspective view of an application of the present invention, the scooter being an electric scooter.

Referring also to FIG. 8, scooter A is an electric scooter. On the upper part of the front wheel set 13, a vertical headstock 16 is fitted to control the rotation direction of the front wheel set 13 and the startup/stop of the scooter.

I claim:

1. A wheelchair assembly comprising:
    a main body having a seat, a foot rest positioned forward of said seat, a front wheel set and a rear wheel set;
    a pair of chair back supports arranged in spaced relation to a back of said seat;
    a pair of chair backs arranged in side-by-side relation at said back of said seat;
    a pair of connecting frames respectively connecting said pair of chair backs to said pair of chair back supports;
    a pair of elastic supports respectively interposed between a back surface of said pair of chair backs and said pair of connecting frames;
    a pair of guide frames respectively adjustably positioned on said pair of connecting frames, the elastic support being pivotally connected by a ledge to the guide frame; and
    a pair of regulating members respectively attached to said pair of guide frames and respectively cooperative with said pair of connecting frames so as to fix a position of the guide frame on the connecting frame, the connecting frame having a plurality of holes formed therethrough in spaced relation, the regulating member having a locking button, said locking button having a stud suitable for engaging one of said plurality of holes.

2. The wheelchair of assembly 1, said main body having a pair of handles respectively formed at a top of said pair of chair back supports so as to extend rearwardly therefrom, said main body having a pair of armrests respectively formed on opposite sides of said seat.

3. The wheelchair assembly of claim 1, said front wheel set having a vertical headstock extending upwardly therefrom so as to control a movement of said front wheel set.

4. A wheelchair assembly comprising:
    a main body having a seat, a foot rest positioned forward of said seat, a front wheel set and a rear wheel set;
    a pair of chair back supports arranged in spaced relation to a back of said seat;
    a pair of chair backs arranged in side-by-side relation at said back of said seat;
    a pair of connecting frames respectively connecting said pair of chair backs to said pair of chair back supports;
    a pair of elastic supports respectively interposed between a back surface of said pair of chair backs and said pair of connecting frames;
    a pair of guide frames respectively adjustably positioned on said pair of connecting frames, the elastic support being pivotally connected by a ledge to the guide frame; and
    a pair of regulating members respectively attached to said pair of guide frames and respectively cooperative with said pair of connecting frames so as to fix a position of the guide frame on the connecting frame, each of pair of elastic supports comprising an elastic gasket having one end secured to the chair back, said elastic gasket having an opposite end affixed to said ledge.

* * * * *